Patented May 22, 1928.

1,670,865

UNITED STATES PATENT OFFICE.

WILLIAM T. MILLER, OF ROYERSFORD, PENNSYLVANIA, ASSIGNOR TO THE UNITED STATES COAL MFG. CO., A CORPORATION OF THE DISTRICT OF COLUMBIA.

METHOD OF PRODUCING BRIQUETTES AND PRODUCT THEREOF.

No Drawing. Application filed October 10, 1923. Serial No. 667,627.

My invention relates particularly to a process of making briquettes from various combustible materials but especially from anthracite or bituminous coal or other carbonaceous materials of a similar nature, as well as the product thereof.

The object of my invention is to provide a process and product of the same whereby briquettes are made which are in the form of hard aggregates and which are waterproof to a very high degree due to the treatment to which the carbonaceous materials have been subjected in the process of manufacture. A further object is to provide in the manufacture of the briquettes, adhesive materials such, for example, as an adhesive containing dextrin, which has been given a very thick or glutinous consistency owing to the partial precipitation of the adhesive material while in solution by the addition of a precipitant which may, for example, be an alcohol. A further object is to, by this means, more effectively fill up the pores or interstices between the particles of the carbonaceous material so as to effectively prevent the absorption of water by the briquettes. A further object is to provide other constituents which assist in the waterproofing of the briquette as hereinafter referred to.

Further objects of my invention will appear from the detailed description thereof contained hereinafter:

My invention may be carried out in many different ways but by way of illustration I shall describe only certain ways of carrying out the same hereinafter.

For example, in accordance with my invention, anthracite coal having a fineness such as to pass through a sieve having from 175 to 200 meshes per inch, may be used and the coal dust thus obtained is mixed in the proportion of from 6 to 10 lbs. of the pulverized coal, but preferably 7 lbs., to 1 lb. of an adhesive and water-proofing mixture, in case the briquettes are to be made by hand-moulding and hand-pressure. In case machine-pressure is applied the preferred proportion is 8 lbs. of coal to 1 lb. of the adhesive and waterproofing mixture referred to.

The mixture used for the adhesive and water-proofing of the briquettes may, for example, be made in one of the following ways; dextrin, which may be white or yellow dextrin, but preferably the white dextrin in powdered form, is mixed to a paste with hot water somewhat below the boiling temperature and thereafter sufficient water is added until there are present by weight, 32 parts of water to 6 parts of dextrin. The dextrin will form a solution in the water added to it. If glucose is used instead, corn syrup is dissolved in either warm or cold water until the strength above referred to is obtained. A solution of common salt in water is now made by dissolving 3 parts by weight of sodium chlorid in 18 parts by weight of water, the mixture being stirred until the solution is complete. The solution of salt and water is now added in the proportion of 21 parts by weight thereof to 128 parts by weight of a 10% solution in water of silicate of soda and when the mixture has been effected I add thereto 38 parts by weight of the dextrin solution above referred to. Thereafter I add to the whole 1 part by weight of an alcohol such, for example, as denatured ethyl alcohol. If desired, the adhesive and waterproofing mixture is now stirred briskly for several minutes and is then mixed with the powdered coal in the proportions above referred to, care being taken that each particle of coal becomes covered with the mixture.

When the particles have been thoroughly intermingled with the adhesive and waterproofing composition the mass is pressed into shape to form briquettes without delay so as to avoid any loss of adhesive quality in the materials present by standing before the formation of the briquettes. The briquettes may be of any desired shape but, for example, may be in the form of flattened rectangular rounded briquettes. The actual formation of the briquettes may be accomplished with the aid of hand-presses but preferably is carried out with a power-press such as will apply pressure of from 2 to 30 tons per square inch. The briquettes having been formed in this way are immediately placed in an oven and baked to a temperature of from 400° to 435° F. for fifteen to twenty minutes.

The briquettes thus obtained will be found to be waterproof to a remarkable degree throughout the interior thereof. This is due largely to the effect of the alcohol which is added to the composition containing dextrin and the effect of which is to partially throw the dextrin out of the solution and therefore form a very gummy and glutinous mass which most effectively serves to plug up the interstices between the particles of coal. It will also be understood, however, that the silicate of soda, as well as the dextrin, serve to incase the various particles of coal so as to render them non-absorbent to water. Also, the dextrin not only serves the purposes above described but is an aid to the subsequent burning of the coal as it is a combustible material itself which in fact assists in bringing about the ignition of the coal. It will also be understood that the effect of the heat upon the silicate of soda would be to render the same insoluble.

The sodium chlorid is found to be a useful constituent in the composition. This is perhaps due to the fact that when the briquettes are burning the sodium chlorid becomes fused by the intense heat and will react on the other constituents present to form gases in the briquettes giving access for oxygen to the same to assist in the combustion thereof.

By the expression partly thrown out of solution I mean rendered more gummy or glutinous or partly thrown out of solution as a solid.

While the said invention has been described in detail I wish it to be understood that many changes may be made therein without departing from the spirit thereof.

I claim:

1. A process which comprises applying an adhesive composition to a finely divided carbonaceous material, said adhesive composition containing a glutinous substance dissolved in water which has been partially thrown out of solution by a precipitant and also containing a soluble silicate.

2. A process which comprises applying an adhesive composition to a finely divided carbonaceous material, said adhesive composition containing a volatilizable salt, silicate of soda and a glutinous substance dissolved in water which has been partially thrown out of solution by a precipitant.

3. A process which comprises applying an adhesive composition to a finely divided carbonaceous material, said adhesive composition containing sodium chlorid, silicate of soda and dextrin dissolved in water which has been partially thrown out of solution by an alcohol.

4. A process which comprises applying an adhesive composition to a finely divided carbonaceous material, said adhesive composition containing sodium chlorid, silicate of soda and dextrin dissolved in water which has been partially thrown out of solution by ethyl alcohol.

5. A process which comprises applying an adhesive composition to finely divided coal, said adhesive composition containing sodium chlorid, silicate of soda and dextrin dissolved in water which has been partially thrown out of solution by a precipitant.

6. A process which comprises applying an adhesive composition to a finely divided coal, said adhesive composition containing sodium chlorid, silicate of soda and dextrin dissolved in water which has been partially thrown out of solution by an alcohol.

7. A process which comprises applying an adhesive composition to a finely divided coal, said adhesive composition containing sodium chlorid, silicate of soda and dextrin dissolved in water which has been partially thrown out of solution by ethyl alcohol.

8. A briquette comprising a finely divided carbonaceous material bound together with a partially precipitated glutinous substance.

9. A briquette comprising a finely divided carbonaceous material bound together with a partially precipitated dextrin.

10. A briquette comprising a finely divided carbonaceous material bound together with a partially precipitated dextrin, silicate of soda and sodium chlorid.

11. A briquette comprising a finely divided coal bound together with a partially precipitated dextrin, silicate of soda and sodium chlorid.

In testimony that I claim the foregoing, I have hereunto set my hand this 6th day of October, 1923.

WILLIAM T. MILLER.